UNITED STATES PATENT OFFICE.

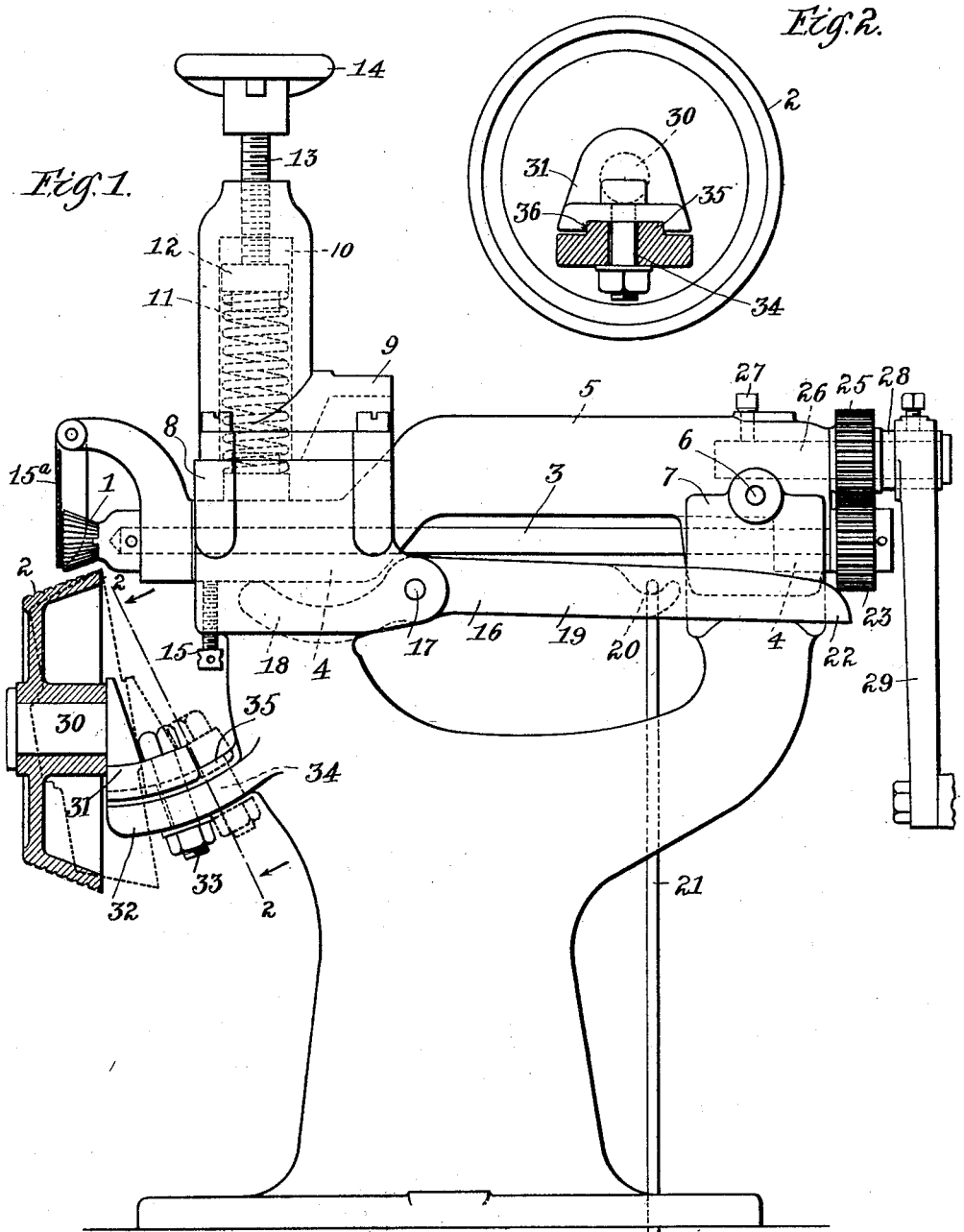

RALPH C. SIMMONS, OF BEVERLY, MASSACHUSETTS, ASSIGNOR TO UNITED SHOE MACHINERY COMPANY, OF PATERSON, NEW JERSEY, A CORPORATION OF NEW JERSEY.

WELT-INDENTING MACHINE.

1,114,300.  Specification of Letters Patent.  Patented Oct. 20, 1914.

Application filed April 17, 1911. Serial No. 621,663.

*To all whom it may concern:*

Be it known that I, RALPH C. SIMMONS, a citizen of the United States, residing at Beverly, in the county of Essex and State of Massachusetts, have invented certain new and useful Improvements in Welt-Indenting Machines; and I do hereby declare the following to be a full, clear, and exact description of the invention, such as will enable others skilled in the art to which it appertains to make and use the same.

This invention relates to welt indenting machines for making impression or imitation stitches along the upper surface of the edge of the sole of a boot or shoe, and also for dividing and evening stitches by making indentations in the leather between them. In one type of machine of this class, the machine is provided with a rotary indenting tool formed with a series of teeth to indent the surface of the leather, and a work support arranged to support the sole in contact with the indenting tool and it is more particularly to this type of machine that the present invention relates.

In order to enable the indenting tool to operate satisfactorily on different styles of work and to permit the character of the indentations to be changed, in machines of this type provision is ordinarily made for adjusting the angular position of the work engaging face of the work support with relation to the working face of the indenting tool by mounting the support so that it is adjustable angularly about a point below its work engaging face as a center. A provision for adjustment of this character is open to objection since the adjustment of the work support about any point outside of its work engaging surface results in a movement of the work engaging surface of the support axially of the indenting tool. Therefore it often happens that in operating upon certain classes of work when the work support is adjusted to form the desired angle between its work engaging surface and the working face of the indenting tool, the work engaging surface of the support is moved outward longitudinally of the working face of the indenting tool to such an extent that it does not properly support the outer margin of the sole in contact with the indenting tool. In order to enable the indenting tool to produce satisfactory impressions, it is essential that the sole be supported at all points that are in engagement with the working face of the tool.

The object of the present invention is to produce a welt indenting machine which will overcome the defects above referred to.

With this object in view, one feature of the invention contemplates provision for adjusting the angular position of the work engaging face of the work support with relation to the working face of the indenting tool without disturbing the relative longitudinal position of these parts. In the preferred form of the invention, this is accomplished by so mounting the work support that it can be adjusted angularly about the point in the inner edge of the support nearest the tool as a center.

Further features of the invention consist of certain constructions, arrangements and combinations of parts, the advantages of which will be readily understood by those skilled in the art, to be hereinafter described and then particularly pointed out in the claims.

In the accompanying drawings illustrating the invention in the best form at present known to the inventor:—Figure 1 is a side elevation of a welt indenting machine embodying the invention, certain parts thereof being shown in section; and Fig. 2 is a section taken on the line 2—2 of Fig. 1, looking in the direction of the arrows.

In the illustrated embodiment of the invention, 1 indicates a rotary indenting tool, and 2 a work support arranged in coöperative relation with said tool. The tool 1 is mounted on a shaft 3 journaled in bearings 4 carried by a hanger 5. In order to provide for movement of the indenting tool toward and from the work support, the hanger 5 is pivoted near its rear extremity upon a shaft 6 carried by a pair of arms, one of which is indicated at 7, extending upward from the standard of the machine. The forward portion of the hanger is arranged to move between guides 8, extending upwardly from the forward portion of the standard of the machine and embracing the hanger. The guides 8 are spanned by a cap 9 bolted thereto, and in a bore 10 in a housing forming a part of this cap is located a compression spring 11, the lower extremity of which is arranged to bear upon the hanger, and the upper extremity of which is engaged by a thrust block 12 actuated by an adjusting screw 13 threaded into the upper extremity of the housing. This screw is provided with a hand wheel 14 by which it may be adjusted to regulate the pressure of the spring 11 upon the hanger 5. The downward movement of the hanger is limited by an adjustable stop screw 15 threaded into the frame of the machine and arranged to engage the lower face of the hanger. By means of the spring 11, the hanger 5 is yieldingly pressed downwardly to compress the sole of the shoe between the working face of the indenting tool 1 and the work engaging face of the work support 2 and thereby cause the teeth of the tool to indent the surface of the leather. In order to render the impressions made by the tool 1 firmer and more permanent, the tool may be heated by any suitable means not shown. The end of the tool is covered by a guard 15ᵃ to prevent contact of the upper therewith.

In order to permit the insertion of the work between the indenting tool and the work support, and the withdrawal of the work therefrom, the machine is provided with manually operable means to lift the hanger 5 against the pressure of the spring 11 and thereby move the indenting tool away from the work support. In the construction illustrated, this means comprises a lever 16 pivoted at 17, the forward extremity 18 of which is arranged to engage the under surface of the hanger. The rearwardly extending arm 19 of this lever is provided with a hook 20 engaged by a treadle rod 21 connected with a treadle, not shown. The lever is also provided with a handle 22 by which it may be operated. When it is desired to insert work which is to be operated upon or to withdraw the finished work, the operator presses the arm 19 of the lever 16 either by means of the treadle or by means of a handle 22, thereby raising the forward portion of the hanger and moving the indenting tool away from the work support.

In the present embodiment of the invention, the indenting tool is preferably arranged to be positively rotated to feed the work through the machine. To this end, in the construction shown, the shaft 3 carries a spur gear 23 keyed thereto, the said gear meshing with a spur gear 25 loosely journaled upon a stub shaft 26 secured in a suitable bore in the hanger 5 by means of a set screw 27. The hub of the gear 25 is extended to form a sleeve 28, to which is secured a crank handle 29, whereby the said gear may be rotated to impart rotation to the shaft 3. It will be noted that both the gears 23 and 25 are carried by the hanger 5 so that the movement of the hanger upon its pivot does not disturb the position of the gears with relation to each other. The gears are, therefore, always in proper meshing relation regardless of the position of the hanger.

The work support 2 is preferably made in the form of a frusto-conical wheel and is arranged to rotate upon a stud 30 projecting from a supporting block 31. In order to provide for the angular adjustment of the work engaging surface of the work supporting wheel with relation to the working face of the indenting tool, the supporting block 31 is adjustably mounted on a segmental guide 32 and is secured thereto by means of a bolt 33 passing through a perforation in the block and a slot 34 in the guide. A rib 35 projects from the upper surface of the guide and is received in a corresponding groove 36 on the block 31, thereby preventing turning movement of the block on the guide. The upper guiding surface of the guide is curved in the arc of a circle, the center of which is a point in the work engaging surface of the work supporting wheel, preferably the point on the inner edge of the wheel nearest the indenting tool. The angular position of the work engaging face of the work support with relation to the working face of the indenting tool is adjusted by moving the wheel supporting block 31 along the guide 32. Since the work supporting wheel is adjusted about a point in its work engaging surface as a center, the position of this point with relation to the indenting tool will not vary in the different positions of adjustment of the work support. The proper relative position of the work support with relation to the indenting tool for satisfactory work, as heretofore explained, will, therefore, always be maintained. With this construction, whatever the position of the support, the entire portion of the sole of the boot or shoe that is in engagement with the indenting tool will be supported and held firmly in contact with the indenting tool.

Having explained the nature and objects of the invention and having specifically described one form of mechanism in which it may be embodied, what is claimed as new is:—

1. A welt indenting machine, having, in combination, a rotary indenting tool, a work support for engaging the tread surface of the sole of a shoe to hold the margin of the sole in contact with the tool having a work engaging surface formed to engage the sole in a straight line from the edge of the sole inwardly and provision for adjusting the work engaging face of the work support angularly in a plane substantially perpendicular to the line of feed about a center lying in the work engaging face of the work support whereby the angle between the work engaging surface of the work support and the adjacent portion of the indenting tool may be varied without varying the position of the work support in the direction of the axis of the indenting tool, and means for continuously forcing the indenting tool and the work support together with a yielding pressure to cause the tool to indent the margin of the sole.

2. A welt indenting machine, having, in combination, a rotary indenting tool, a work support for engaging the tread surface of the sole of a shoe to hold the margin of the sole in contact with the tool having a work engaging surface formed to engage the sole in a straight line in a direction from the edge of the sole inwardly and provision for adjusting the work engaging surface of the work support angularly in a plane substantially perpendicular to the line of feed about a center lying in the work engaging surface of the work support and located at the point in the inner edge of the work support nearest the tool whereby an angle between the work engaging surface of the work support and the adjacent portion of the indenting tool may be varied without changing the position of the work support in the direction of the axis of the tool, and means for continuously forcing the work support and the tool together with a yielding pressure to cause the tool to indent the margin of the sole.

RALPH C. SIMMONS.

Witnesses:
 NORMAN C. HUSSEY,
 ELMER B. GRUSH.

Copies of this patent may be obtained for five cents each, by addressing the "Commissioner of Patents, Washington, D. C."